United States Patent
Aschwanden et al.

(10) Patent No.: US 12,547,019 B2
(45) Date of Patent: Feb. 10, 2026

(54) METHOD FOR MANUFACTURING A CUSTOMIZED OPTICAL ELEMENT TO ADJUST AN OPTICAL PROPERTY OF AN OPTICAL COMPONENT

(71) Applicant: Optotune Switzerland AG, Dietikon (CH)

(72) Inventors: Manuel Aschwanden, Allenwinden (CH); David Andreas Niederer, Küttigen (CH)

(73) Assignee: Optotune Switzerland AG, Dietikon (CH)

(*) Notice: Subject to any disclaimer, the term of this patent is extended or adjusted under 35 U.S.C. 154(b) by 0 days.

(21) Appl. No.: 18/772,183

(22) Filed: Jul. 14, 2024

(65) Prior Publication Data

US 2025/0020944 A1    Jan. 16, 2025

(30) Foreign Application Priority Data

Jul. 14, 2023    (DE) .................... 10 2023 118 774.0

(51) Int. Cl.
  *G02C 7/02*    (2006.01)
  *B29D 11/00*    (2006.01)
  (Continued)

(52) U.S. Cl.
  CPC ........ *G02C 7/027* (2013.01); *B29D 11/00548* (2013.01); *B29D 11/00951* (2013.01);
  (Continued)

(58) Field of Classification Search
  CPC ............ G06Q 30/015; G06Q 30/0281; G06Q 30/0601; B29D 11/00951;
  (Continued)

(56) References Cited

U.S. PATENT DOCUMENTS

| 11,613,090 B1 | 3/2023 | Smyth |
| 2005/0060196 A1* | 3/2005 | Tsushi .................... G06Q 30/06 705/2 |

(Continued)

FOREIGN PATENT DOCUMENTS

| CN | 207264042 U | * 4/2018 |
| DE | 19858849 | 6/2000 |

(Continued)

OTHER PUBLICATIONS

English translation of CN207264042U retrieved from Espacenet (Year: 2025).*

*Primary Examiner* — Jacob T Minskey
*Assistant Examiner* — Elisa H Vera
(74) *Attorney, Agent, or Firm* — JMB Davis Ben-David

(57) ABSTRACT

The invention relates to a method for manufacturing a customized optical element to adjust an optical property of an optical component, such as goggles, wherein the method comprises the steps of receiving customer data indicative of a visual defect a person and/or a desired visual correction of the optical component; determining, from the customer data, the shape of a first surface of an optical element to be manufactured, such that the optical component, when the optical element is applied to an optical surface of the optical component, compensates at least partially or entirely the visual defect of the person or exhibits the desired visual correction; manufacturing the optical element using a liquid material that when brought in shape, is solidified.

16 Claims, 5 Drawing Sheets

(51) Int. Cl.
*B29K 105/00* (2006.01)
*G06F 30/17* (2020.01)
*G06Q 30/015* (2023.01)
*G06Q 30/02* (2023.01)
*G06Q 30/0601* (2023.01)

(52) U.S. Cl.
CPC ............ *G06F 30/17* (2020.01); *G06Q 30/015* (2023.01); *G06Q 30/0281* (2013.01); *G06Q 30/0601* (2013.01); *B29K 2105/0058* (2013.01)

(58) Field of Classification Search
CPC ...... B29D 11/00548; B29K 2105/0058; G06F 30/17; G02C 7/027
See application file for complete search history.

(56) References Cited

U.S. PATENT DOCUMENTS

| | | | | |
|---|---|---|---|---|
| 2009/0250828 | A1* | 10/2009 | Rosen | B29D 11/00125 |
| | | | | 425/162 |
| 2011/0018150 | A1* | 1/2011 | Silver | B29D 11/00528 |
| | | | | 264/1.38 |

FOREIGN PATENT DOCUMENTS

| | | |
|---|---|---|
| DE | 102021126599 | 4/2023 |
| EP | 4043195 | 8/2022 |
| WO | 9848315 | 10/1998 |

* cited by examiner

METHOD FOR MANUFACTURING A CUSTOMIZED OPTICAL ELEMENT TO ADJUST AN OPTICAL PROPERTY OF AN OPTICAL COMPONENT

CROSS REFERENCE TO RELATED APPLICATIONS

Benefit is claimed to German Patent Application No. DE 10 2023 118 774.0 filed Jul. 14, 2023, the contents of which are incorporated by referenced herein in their entirety.

FIELD

The invention relates to a method for manufacturing a customized optical element to adjust an optical property of an optical component.

BACKGROUND

People with visual impairment, e.g. myopia face problems when buying or renting optical components, such sunglasses, ski-goggles, swimming-goggles, diving-goggles or virtual reality goggles as typically none of them are corrected for the specific impairment. Manufacturing these optical components specifically to the needs of the person's visual defect or deficit is prohibitively expensive.

Therefore, people with visual impairment are left with little choices when renting or buying optical components.

The invention sets out to resolve this problem by providing an ad-hoc method for adjusting optical properties of existing an optical component to the needs of visually impaired people.

SUMMARY

An object of the present invention is to provide a method that allows for customized manufacturing of optical elements for adapting existing optical components of a customer, such as glasses, by combining the optical element with the optical component. The object is achieved by a method having the features of the independent claims.

Advantageous embodiments are described in the dependent claims.

BRIEF DESCRIPTION OF THE FIGURES

FIGS. 4A-4E show a method for manufacturing the optical element; and

DETAILED DESCRIPTION

Figure 1:
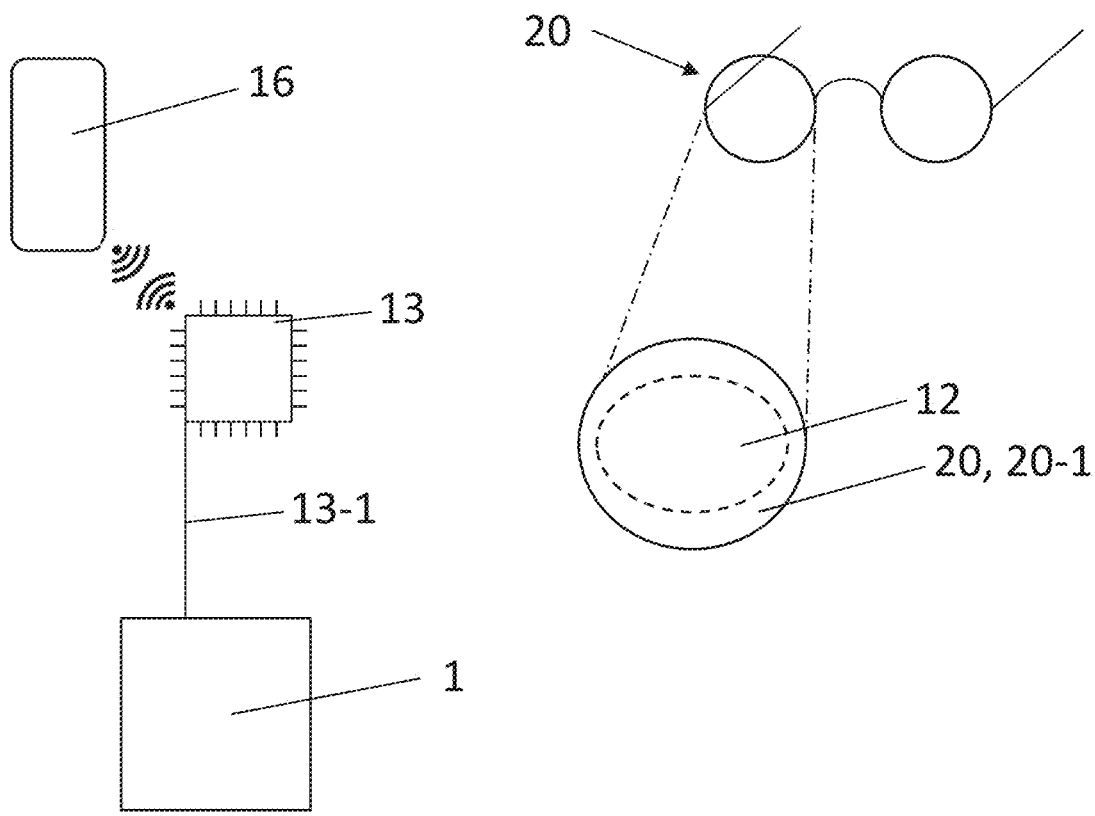
FIG. 1 shows an embodiment of the method according to the invention.

According to a first aspect the invention, a method for manufacturing a customized optical element to adjust an optical property of an optical component, such as goggles or glasses, comprises the steps of:

i) Receiving on a processor a customer data indicative of a visual defect of a person and/or a desired visual correction of the optical component;

ii) Determining, from the customer data, e.g. by a computer program executed on the processor, the shape of a first surface of an optical element to be manufactured, such that the optical component, when the optical element is applied to an optical surface of the optical component, compensates at least partially or entirely the visual defect of the person or exhibits the desired visual correction;

iii) Arranging a transparent solidifiable liquid material in a cavity, wherein the cavity comprises a first surface portion, wherein the first surface portion of the cavity is formed by a first deformable membrane;

iv) Adjusting a shape of the first deformable membrane, such that the shape of the first deformable membrane corresponds to the shape determined from the customer data for the first surface of the optical element;

v) Solidifying the liquid material to obtain the optical element, wherein the first surface of the optical element conforms to the first deformable membrane, such that the optical element comprises an optical property, such as an optical power adjusted by the shape of the first surface, vi) particularly attaching the optical element to an optical surface of the optical component, particularly such that the first surface of the optical element faces away from the optical surface of the optical element.

The method allows for manufacturing customized optical elements for adjusting an optical property or characteristic of an optical component.

The optical property may be for example be selected from one or more of the group consisting of: an optical power, an optical aberration, such as astigmatism, cylinder, prism, and/or coma.

Particularly, the optical property is not only adjusted in terms of only a transparency, only a polarization, or only a color, the term optical property relates to some optical power or astigmatism, i.e. a wave-front form affecting optical property.

The method allows therefore an adjustment of optical power or an aberration of optical components, e.g. sunglasses devoid of optical power, with the optical element. The method allows to adjust a shape of the surface of the optical element such as to produce an optical power that may be provided via the optical element to the optical component.

The customer data may be a prescription or data that comprise information on a visual defect or deficiency that may be compensated by the optical element or a combination of the optical component and the optical element.

Based on the customer data an optical power and/or an optical aberration and thus a shape of the optical element may be determined.

For this purpose, it may be necessary to obtain a shape information on the optical surface of the optical component and/or the optical property of the optical component.

Manufacturing the optical element is then facilitated by means of a liquid material that may be solidified, particularly permanently solidified. The material may be selected from a group of polymers that e.g. under illumination with a selected wavelength solidifies.

The liquid material is provided on a first membrane that is shaped with a surface portion according to the desired surface shape of the optical element.

Adjusting the shape might be achieved by means of fluid pressure under, or above the first membrane.

In addition, the cavity may comprise a second surface portion of the cavity, wherein the optical element comprises an optical property adjusted by the shape of the first and the second surface.

The second surface portion may be formed by a second deformable membrane, and wherein a shape of the second membrane is adjusted in step iii), such as to adjust a shape of the second surface portion of the cavity.

Then, a shape of the second deformable membrane may be adjusted, such that the shape of the second deformable membrane corresponds to the shape determined from the customer data for the second surface of the optical element.

According to another embodiment of the invention, a first party provides and/or authorizes the provision of the optical component, or has received said optical component from a customer, wherein the first party executes and/or authorizes execution of at least the method steps iii) to v).

This embodiment allows for example a vendor of the optical component to adjust the optical property of the optical component by manufacturing the optical element or by authorizing manufacturing of the optical element for the customer.

According to another embodiment of the invention, the customer, particularly wherein the customer is the person with the visual defect or deficiency, provides and/or authorizes the provision of the customer data to the first party.

This embodiment allows for improved data control, which particularly in the field of personal and medical data is an important aspect in terms of data security and privacy.

According to another embodiment of the invention, the processor is connected to a manufacturing device configured to execute at least the steps iii) to v), wherein the processor is configured to issue control commands to the manufacturing device causing the manufacturing device to manufacture the optical element.

This allows to execute the method in a system or in a single device, wherein the processor instructs the manufacturing device accordingly.

This embodiment allows to have processor and manufacturing device at separate spaces or comprised in the same device.

According to another embodiment of the invention, the processor is comprised by a cloud server and connected to the manufacturing device via a computer network or wherein the processor is located at or comprised by the manufacturing device.

This embodiment allows for decentralized processing of the customer data or a centralized processing of the customer data.

According to another embodiment of the invention, the customer data is transmitted electronically to the processor, the transmission being authorized by a computerized device of the customer, particularly wherein the computerized device is a mobile, particularly a handheld, computerized device.

This embodiment allows to electronically exchange customer data with the processor, which in turn reduces errors due to data transcription, e.g. from digital to paper and back to digital.

According to another embodiment of the invention, an app is stored and executed on the computerized device, wherein the app has access to and/or stores the customer data and wherein the app causes the handheld computerized device to transmit the customer data to the processor.

This embodiment allows to provide medical apps with the capability to provide the customer data to the processor in order to facilitate manufacturing of the optical element.

Particularly, for the customer an increase of convenience in terms of ease-of-use is achieved by this embodiment.

According to another embodiment of the invention, the customer data is provided via a web interface to the processor.

This embodiment allows for a more flexible approach and interfacing to the processor, such for example a dedicated app is not required.

According to another embodiment of the invention, the customer selects the optical component from a plurality of optical components, and provides the customer data such as to adjust the optical properties of the selected optical component by executing the method.

According to another embodiment of the invention, the plurality of optical components is exhibited in a store or in an online store, where the optical components are displayed on a website of the online store.

This embodiment allows placing the method in a commercial store, online or on premises, wherein the customer may select the optical component, e.g. from a selection of various sunglasses or diving/swim goggles.

According to another embodiment of the invention, the store is located on store premises at which the customer is present.

According to another embodiment of the invention, the customer selects the optical component on the website and provides the customer data to the online store, wherein the optical component and the optical element are sent to the customer, particularly wherein either the optical element is applied to the optical surface of the optical component already, or the optical element is not applied to the optical component already.

According to another embodiment of the invention, the manufacturing device is located at the store premises.

According to another embodiment of the invention, the optical component, when the optical element is not attached to it, is devoid of corrective optics for adjusting a visual defect.

According to a second aspect of the invention, a method for manufacturing a customized optical element to adjust an optical property of an optical component, such as goggles or glasses, comprises the steps of:

i) Arranging a customer at a manufacturing device, the manufacturing device comprising a first aperture through which the customer may look with an eye, wherein the manufacturing device further comprises a first deformable transparent membrane on a side of the aperture that is opposite of the customer, wherein the manufacturing device is configured to adjust a shape of the first membrane such as to form a first surface portion of a cavity, ii) Arranging a transparent solidifiable liquid material in the cavity and on the first surface portion, iii) Receiving instructions from the customer on a perceived image quality when looking with the eye through the aperture and the liquid filled cavity on an image arranged at the manufacturing device, iv) Adjusting the shape of the first membrane v) Repeating step iii) and iv), until the perceived image quality is not improved any more according to the customer, vi) Solidifying the liquid material to obtain the optical element, wherein the first surface of the optical element conforms to the first deformable membrane, such that the optical element comprises an optical property adjusted by the shape of the first surface.

The second aspect of the invention allows manufacturing optical elements for adjusting an optical property of an optical component without any customer data via direct feedback with the customer, who controls and guides the process of shaping the optical element.

For this purpose, the method is particularly executed while the customer looks through the liquid material and therefore gets an impression on the optical correction when the membrane shape is adjusted.

According to another embodiment of the second aspect, the optical component is arranged at the manufacturing device such that the customer looks through the aperture via the cavity through the optical component.

This allows to taking into account any optical power or an optical distortion that might be comprised already in the optical component.

According to another embodiment of the second aspect, the manufacturing device comprises a compensation optics, configured to compensate for an optical difference between the transparent solidifiable liquid material and the solidified liquid material, such that the customer perceives the image during steps iii) to and v) as if the liquid material would be solidified already.

Further, with regard to the second aspect of the invention, it is explicitly noted that any embodiment disclosed in the context of the first aspect, may form an embodiment of the second aspect and vice versa.

Particularly, embodiments and/or features relating the second aspect may be combined with the invention according to the first aspect and vice versa.

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the method according to the present invention.

FIG. 1 shows an example of the method according to the invention. From a mobile device 16, such as a mobile phone, customer data are transmitted to a computer, comprising a processor 13. The computer, may be located in a store, particularly in a manufacturing device 1 for manufacturing the optical element 12.

The computer, may also be located at a different location. The computer and thus the processor 13 are connected to the manufacturing device 1 in any case. This connection 13-1 may be facilitated by a wired connection or also by wireless connection. The computer comprises receiving means, such as a receiver device, for receiving the customer data from the mobile device. 16. The customer data comprises information on a visual defect or deficit. The processor is provided with this information and potentially further information of an optical component 20 for which the optical element 12 is to be manufactured. This further information may be information on an optical specification of the optical component 20, e.g. an optical power and/or a size of an optical surface 20-1 of the optical component 20 on which the optical element 12 is to be arranged on.

The customer data particularly comprises information for a left and a right eye, such that two optical elements 12—one for the right eye portion of the optical component 20 and one for the left eye portion of the optical component 20 may be manufactured with individual optical characteristics.

The processor 13 is configured e.g. by means of a computer program being executed on the processor 13 to determine at least a first surface shape of the optical element 12. The optical element 12 is manufactured such that the optical element 12 comprises a second surface opposite the first surface, wherein the optical element 12 is attached to the optical surface of the optical component 20 with its second surface.

For this purpose, also the shape of the second surface may be adjusted, particularly to conform to the optical surface of the optical component 20, i.e. to have the same shape as the optical surface of the optical component 20.

The shape of the first surface of the optical element 12 is particularly formed such that it compensates the visual defect or deficit at least partially particularly when the optical element 12 is attached to attached to the optical component 20.

This way the optical characteristics of optical components 20, such as sunglasses, ski-goggle, swimming-goggles, virtual reality goggles etc. may be adjusted on-site.

Once the processor has determined the shape of the first surface of the optical element 12, this shape is provided to the manufacturing device 1 as instructions. These instructions cause the manufacturing device 1 to generate a cavity, having a deformed membrane surface that when a liquid solidifiable material, e.g. a transparent UV-curable polymer, is arranged in the cavity adopts the first shape. Thus, when the liquid material is solidified the optical element 12 having the first surface shaped as desired, is obtained. The manufacturing processes and variations thereof is illustrated in FIG. 4.

The customer data may stem form other sources than the mobile device, but for example can be provided by means of a user interface, for example by means of a web-interface on a website, to the processor 13.

Figure 2:
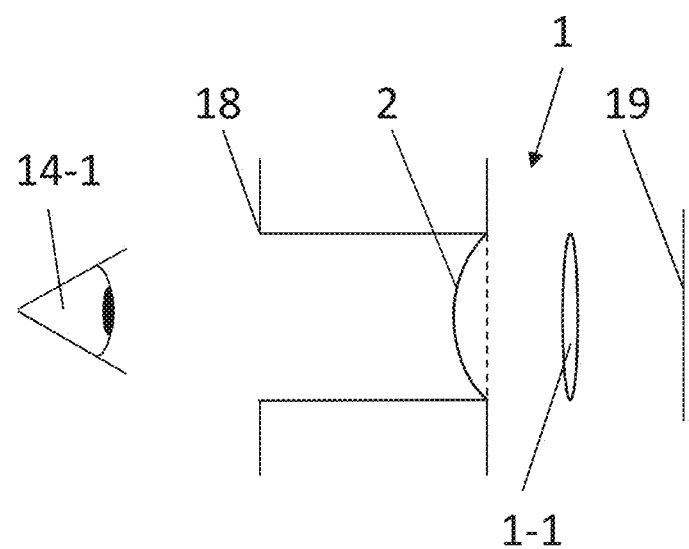
FIG. 2 shows an alternative embodiment of the invention.

In FIG. 2 a second aspect of the invention is illustratively depicted. In this variant, instead of providing the customer data to the processor, the shape of the first membrane 2 is interactively adjusted by means of a customer feedback. For this, the customer may look with one eye 14-1 through an aperture 18 of the manufacturing device 1, wherein in front of the aperture 18 the first membrane 2 with the liquid material is arranged such that the customer look through said liquid material toward an image 19 or a structure. The first membrane 2—and in case a second membrane is present may be adjusted in shape until the customer perceives no more or only little more improvement of visual quality when looking at the image 19 or the structure. Thus, the method adjusts to instructions from the customer until the image 19 or the structure is seen sharply, particularly magnified or de-magnified, and/or undistorted by the customer. Then, the liquid material is solidified such that the optical element comprises the optical properties that correspond to the customer instructions.

For this purpose, the first and/or second membrane shape may be adjusted to compensate for optical changes of the material when switching from the liquid to the solid state.

Alternatively, or additionally, the manufacturing device 1 comprises compensation optics 1-1 that account for the change of optical properties when the material is solidified. These compensation optics 1-1 are configured such that the customer, when looking through the liquid material perceives the image 19 or the structures as if the material is solidified.

Figure 3:
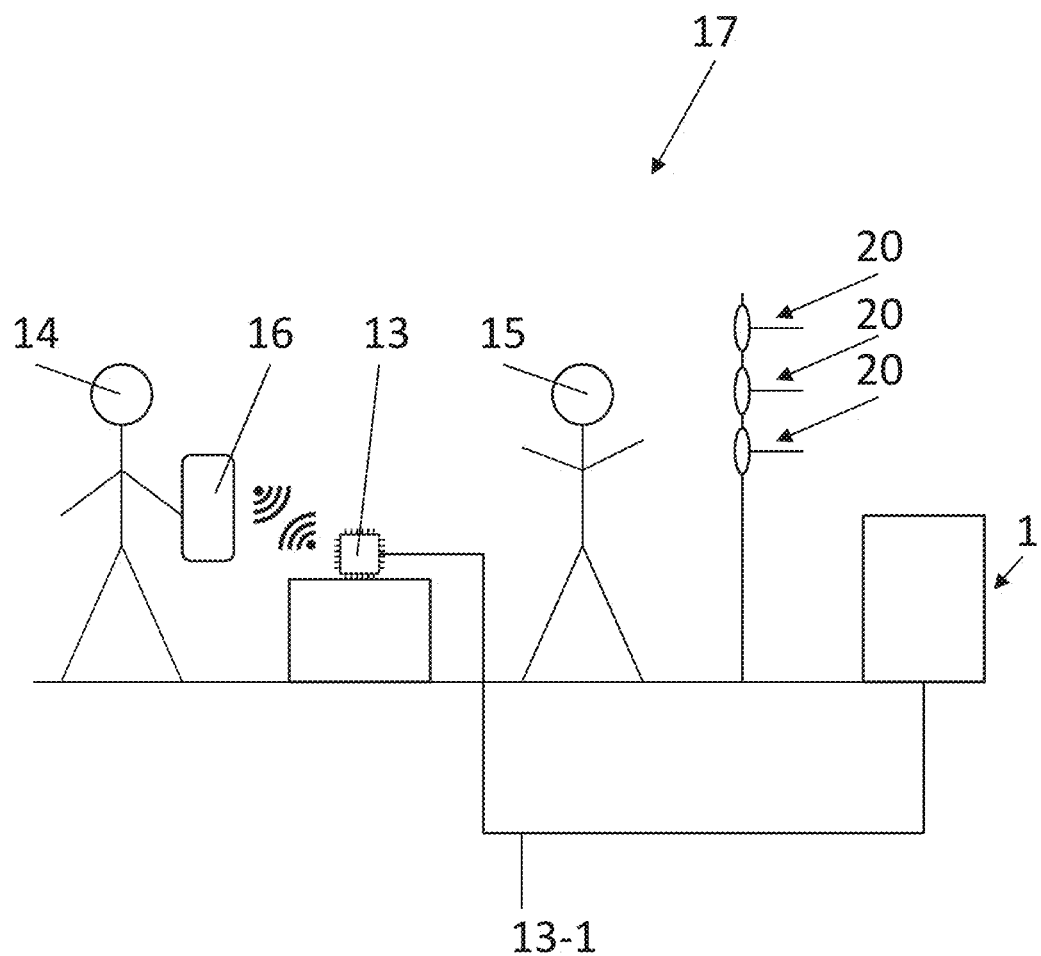
FIG. 3 depicts and embodiment in a store being equipped with the manufacturing device.

In FIG. 3, an embodiment of the invention is depicted. In this example, a store 17 or rental store located on premises offers a variety of optical components 20, e.g. sunglasses and/or ski-goggles. The optical component 20 are devoid compensatory optical properties, meaning they are devoid of corrective optics for adjusting visual defects or deficits of a person wearing the optical component 20.

A customer 14 present on the premises of the store 17 selects one of the optical components 20 and provides the customer data via a mobile device 16 of his/her comprising the information on the visual defect to a computer comprising the processor 13.

Store personal, also referred to as first party 15, may verify the information and executes a transaction. Further, the personal may authorize the manufacturing device 1 to execute the method for generating the optical element for the optical component 20. The shape of the optical elements first surface is provided and determined by the processor based on the customer data. The computer then instructs or provides said information to the manufacturing device 1, in this example via a connection line 13-1. The manufacturing device 1 then manufactures the optical element instantaneously, by executing the method steps as laid out in the following examples or preceding embodiments.

In addition to the customer data, information on the selected optical component 20 may be provided, and/or information on a size and/or lateral contour of the optical element may be provided to the manufacturing device, such that the optical element fits laterally on the optical surface of the optical component 20.

FIG. 4 shows a schematic cross-sectional drawing extending in main extension plane x direction and optical axis z of a manufacturing device 1 for manufacturing an optical element 12 in views a), b1), b2), c) and d). The manufacturing device 1 comprises a first membrane 2 and a second membrane 3 forming a cavity 100 with a first and a second surface portion 101, 102 of the cavity 100. The first and the second membranes 2, 3 may be transparent and consist of an elastic polymer. In the following the features and functionalities of the manufacturing device 1 may relate to the method according to the invention in the same fashion, such that FIG. 4 serves also for illustrating the method and its steps for manufacturing an optical element 12 in a customized fashion for an optical component 20.

As shown in view a) of FIG. 4, the first membrane 2 and the second membrane 3 in a first state of the manufacturing device 1 both extend along a main extension plane x and are essentially flat. In a manner not shown here, the membranes 2, 3 each have a substantially circular cross-section, which extends into the image plane of FIG. 4.

The membranes 2, 3 are spaced apart by a ring like spacer 4 and together form the cavity 100 filled with a transparent liquid polymer 5. The polymer is a so-called UV-curing polymer 5 that cross-links when exposed to UV radiation, changing from a liquid state to an increasingly solid state. This effect is used to obtain the optical element 12 from the transparent liquid polymer 5.

The optical element 12 serves as an applicable element for the optical component 20, to adjust the optical properties of the optical component 20 as required. The optical component 20 may be the lens of a pair of glasses, in particular sunglasses, ski goggles or virtual reality glasses (cf. e.g. FIG. 5).

In order to adjust the optical properties of said optical component 20 as required by customer data that comprise information on a visual deficit or defect, the liquid polymer 5 is adapting to a shape of the first membrane 2 and second membrane 3 according to the shape of the desired optical element 12 and its optical properties.

This is shown in views b1) and b2) of FIG. 4, each of which illustrates different ways in which the membranes 2, 3 can be deformed to obtain the shape of the first and the second surface portion 101, 102 of the cavity 100 and thus a first and at second surface 12-1, 12-2 of the optical element 12.

According to view b1) of FIG. 4, a mechanical deformation means 6 is used, which exerts a compressive force 7 on the first membrane 2, thereby deforming it and adjusting its shape.

As a result of the deformation of the first membrane 2, the hydraulic pressure in the polymer 5 increases, causing the second membrane 3 to also deform. In this way, the first membrane 2 and the second membrane 3 can be deformed simultaneously and according to the desired shape.

During or after deformation, the polymer 5 is exposed to ultraviolet radiation 9 from a radiation source 8 through the second membrane 3.

As an alternative to the process shown in view b1) of FIG. 4, according to view b2) the deformation device 6 can also be used to exert a pulling force 10 that is applied to the first membrane 2. As a result of the low pressure thus generated, the second membrane 3 is also deformed, whereby the desired shape of the optical element 12 to be produced can also be adjusted. Here, the deformation means 6 is attached to the first membrane 2 by means of an adhesive.

The curing process shown in views b1) and b2) is controlled depending on the curing state of the polymer 5 and may be terminated before the polymer 5 is fully cured. This can be done in a simple way by controlling the irradiation duration or irradiation intensity, on which the degree of cure depends.

As shown in view c) of FIG. 4, following the curing process, membranes 2 and 3 are removed and the cured polymer is trimmed along a cutting line 11.

Subsequently, in view d), the optical element 12 with the first 12-1 and the second surface 12-2 is obtained according to the shape shown in view d) of FIG. 4.

Figure 4A:
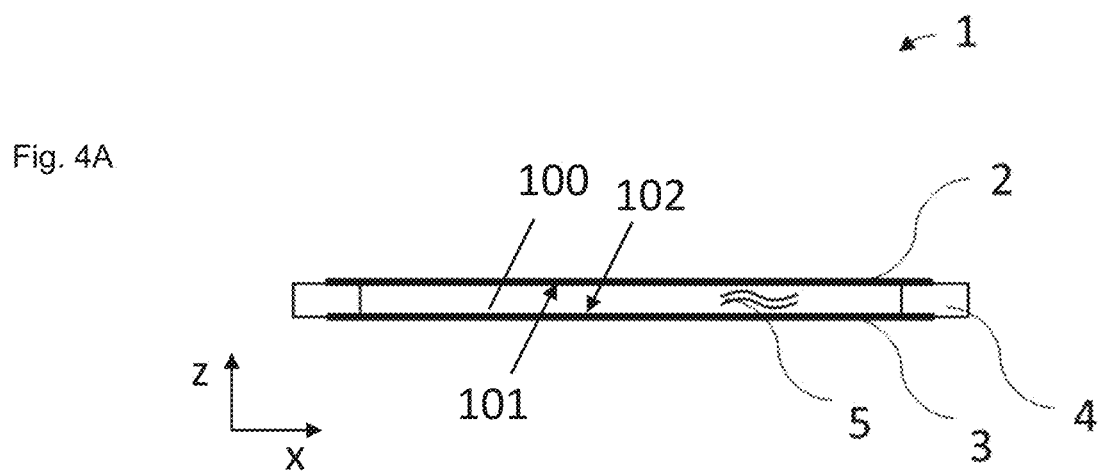
Figure 4A:
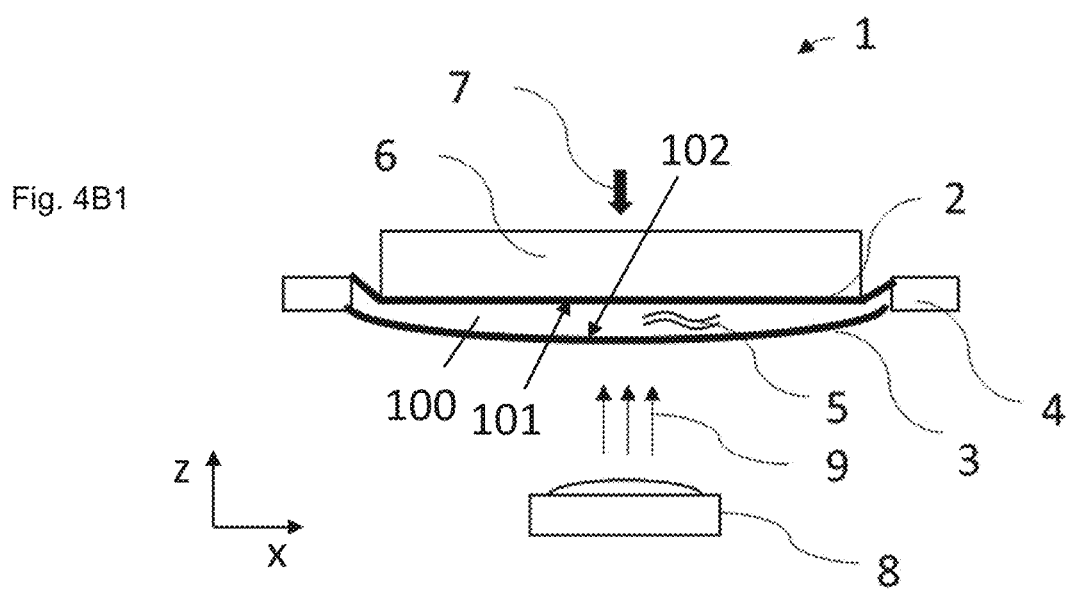
Figure 4A:
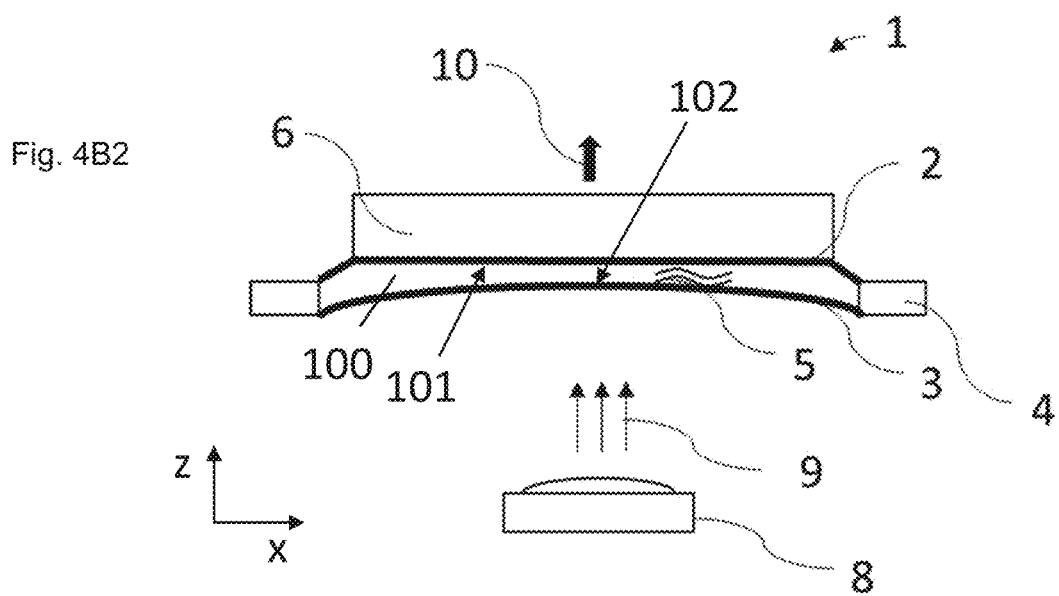
Figure 4C:
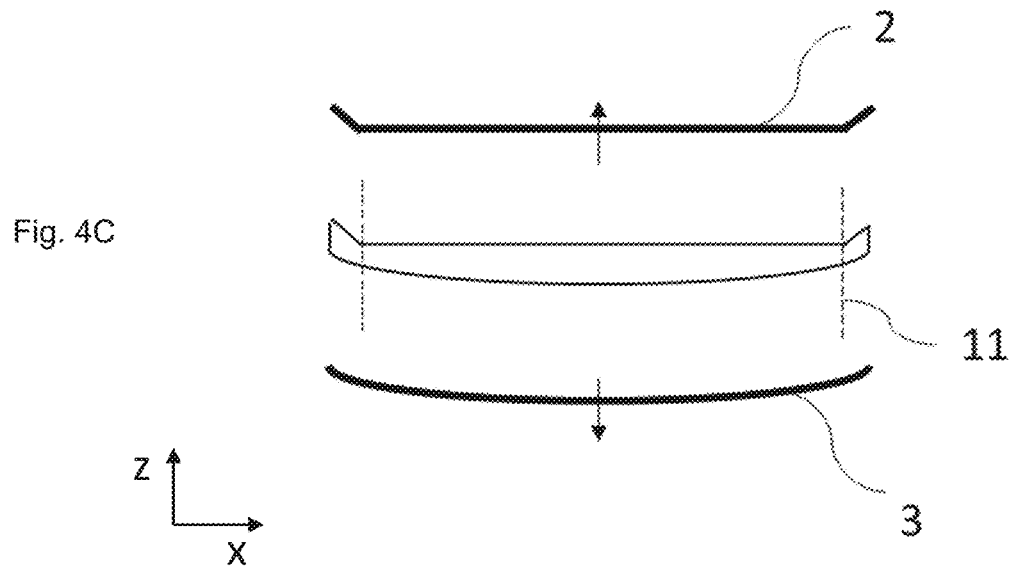
Figure 4D:
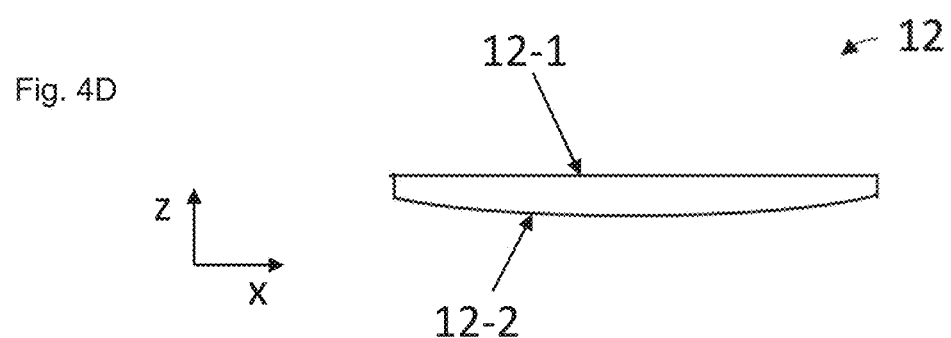
Figure 4E:
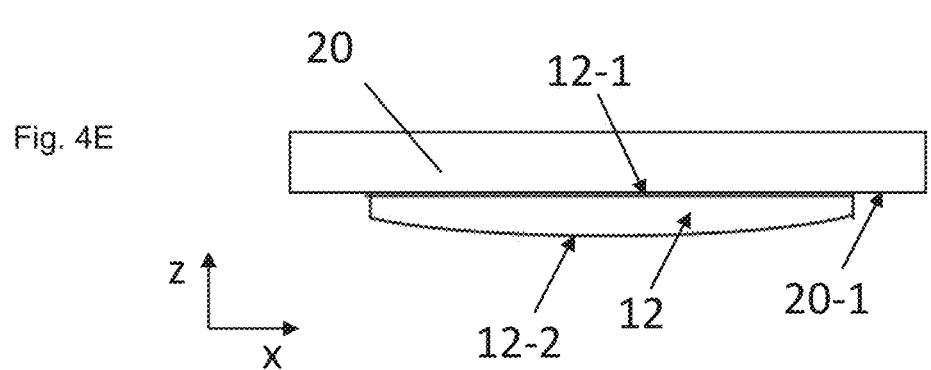

The optical element 12 may be attached to the optical component 20 as shown in FIG. 4e). This may be facilitated by means of Van del Waals forces, particularly only by means of Van der Waals forces. For this purpose, the optical element 12 may be attached or pressed with its first surface 12-1 to an optical surface 20-1 of the optical component 20, such that the optical element 12 and the optical component 20 are in close contact to enable the Van der Waals forces to permanently fix the optical element 12 to the optical component 20.

Figure 5:
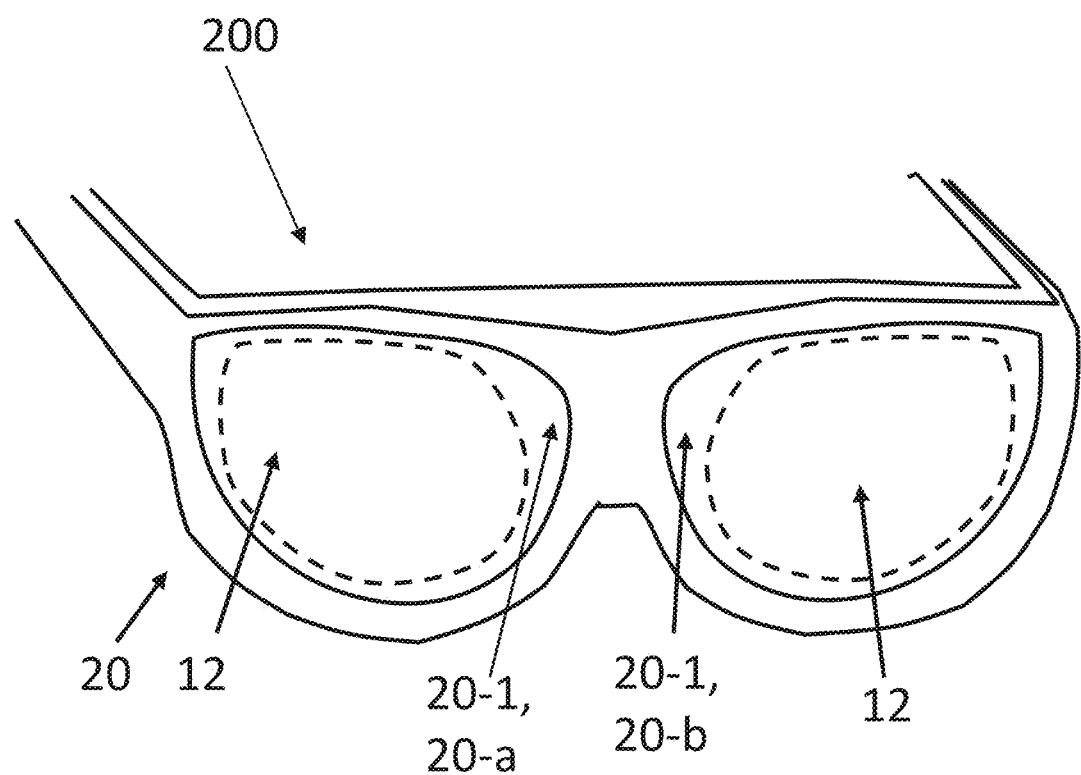
FIG. 5 shows an adjusted optical component.

FIG. 5 shows an optical component 20 in form of sunglasses having an optical element 12 attached to it on the side of the eyes of a user of the sunglasses. Analogously, an optical element is arranged on the optical surface 20-1 of the left eye portion 20-b. The optical component 20 and the optical element 12 form an optical system 200, wherein the optical element 12 is manufactured to adjust an optical aberration such as cylinder, astigmatism or another higher-order Zernike polynomial describing an optical aberration. This way, the sunglasses 20 that may not exhibit any optical power or aberrational adjustment, may be adjusted in terms of the optical power and the optical aberrations by the optical element 12 to correct for vision deficits of the user in a cost-efficient way.

| Reference numerals | |
|---|---|
| 1 | manufacturing device |
| 1-1 | compensation optics |
| 2 | first membrane |
| 3 | second membrane |

-continued

| Reference numerals | |
|---|---|
| 4 | spacer |
| 5 | transparent liquid polymer |
| 6 | deformation means |
| 7 | compressive force |
| 8 | radiation source |
| 9 | ultraviolet radiation |
| 10 | pulling force |
| 11 | cutting line |
| 12 | optical element |
| 12-1 | first surface |
| 12-2 | second surface |
| 13 | processor |
| 13-1 | connection line |
| 14 | customer |
| 14-1 | eye of customer |
| 15 | first party |
| 16 | mobile device |
| 17 | store |
| 18 | aperture |
| 19 | image |
| 20 | optical component |
| 20-1 | optical surface |
| 20-a | right eye portion |
| 20-b | left eye portion |
| 100 | cavity |
| 101 | first surface portion |
| 102 | second surface portion |
| 200 | optical system |
| z | optical axis |
| x | main extension plane |

The invention claimed is:

1. A method for manufacturing a customized optical element (12) to adjust an optical property of an optical component (20), wherein the method comprises the steps of:
   i) selecting an optical component (20) from a plurality of optical components (20), and providing the customer data such as to adjust the optical properties of the selected optical component (20);
   ii) obtain a shape information on the optical surface of the optical component;
   iii) Receiving on a processor (13) the customer data indicative of a visual defect or deficiency of a person and/or a desired visual correction of the optical component, and receiving on the processor (13) the shape information on the selected optical component (20);
   iv) Determining, from the customer data, the shape of a first surface (12-1) of an optical element (12) to be manufactured including a size and/or lateral contour of the optical element (12), such that the optical component (20), when the optical element (12) is applied to an optical surface (20-1) of the optical component (20), compensates at least partially or entirely the visual defect of the person or exhibits the desired visual correction, and such that the optical element (12) fits laterally on the optical surface of the optical component (20);
   v) Arranging a transparent solidifiable liquid material (5) in a cavity (100), wherein the cavity (100) comprises a first surface portion (101), wherein the first surface portion (101) of the cavity (100) is formed by a first deformable membrane (2);
   vi) Adjusting a shape of the first deformable membrane (2), such that the shape of the first deformable membrane (2) corresponds to the shape determined from the customer data for the first surface (12-1) of the optical element (12);
   vii) Solidifying the liquid material (5) to obtain the optical element (12), wherein the first surface (12-1) of the optical element (12) conforms to the first deformable membrane (2), such that the optical element (12) comprises an optical property adjusted by the shape of the first surface (12-1), wherein the solidified optical element comprises a second surface opposite the first surface, wherein a shape of the second surface is configured and designed to conform and to be attached to the optical surface of the optical component (20).

2. The method according to claim 1, wherein a first party (15) provides and/or authorizes the provision of the optical component (20), or has received said optical component (20) from a customer (14), wherein the first party (15) executes and/or authorizes execution of at least the method steps iii) to v).

3. The method according to claim 2, wherein the customer (14) provides and/or authorizes the provision of the customer data to the first party (15).

4. The method according to claim 1, wherein the processor (13) is connected to a manufacturing device (1) configured to execute at least the steps iii) to v), wherein the processor (13) is configured to issue control commands to the manufacturing device (1) causing the manufacturing device (1) to manufacture the optical element (12).

5. The method according to claim 4, wherein the processor (13) is comprised by a cloud server and connected to the manufacturing device (1) via a computer network or wherein the processor (13) is located at or comprised by the manufacturing device (1).

6. The method according to claim 4, wherein the manufacturing device (1) is located at the store (17) premises.

7. The method according to claim 1, wherein the customer data is transmitted electronically to the processor (13), the transmission being authorized by a computerized device (16) of the customer (14).

8. The method according to claim 7, wherein on the computerized device (16) an app is stored and executed, wherein the app has access to and/or stores the customer data and wherein the app causes the computerized device (16) to transmit the customer data to the processor (13).

9. The method according to claim 1, wherein the customer data is provided via a web interface to the processor (13).

10. The method according to claim 1, wherein the plurality of optical components (20) is exhibited in a store (17) or in an online store, where the optical component is displayed on a website of the online store.

11. The method according to claim 10, wherein the store (17) is located on store premises at which the customer (14) is present.

12. The method according to claim 10, wherein the customer (14) selects the optical component (20) and provides the customer data to the online store, wherein the optical component (20) and the optical element (12) are sent to the customer.

13. The method according to claim 1, wherein the optical component (20), when the optical element (12) is not attached to it, is devoid of corrective optics for adjusting a visual defect.

14. The method according to claim 1, wherein the optical property of the optical element (12) that is adjusted by the shape of the first surface is selected from one or more of the group consisting of: an optical aberration, astigmatism, cylinder, prism, coma.

15. The method according to claim 1, wherein the optical element is attached to the optical surface of the optical component.

16. A method for manufacturing a customized optical element (12) to adjust an optical property of an optical component (20), wherein the method comprises the steps of:

i) selecting an optical component (20) from a plurality of optical components (20), and providing the customer data such as to adjust the optical properties of the selected optical component (20);

ii) obtain a shape information on the optical surface of the optical component;

iii) receiving on a processor (13) the customer data indicative of a visual defect or deficiency of a person and/or a desired visual correction of the optical component and receiving on the processor (13) the shape information on the selected optical component (20);

iv) determining, from the customer data, the shape of a first surface (12-1) of an optical element (12) to be manufactured including a size and/or lateral contour of the optical element (12), such that the optical component (20), when the optical element (12) is applied to an optical surface (20-1) of the optical component (20), compensates at least partially or entirely the visual defect of the person or exhibits the desired visual correction, and such that the optical element (12) fits laterally on the optical surface of the optical component (20);

v) arranging a transparent solidifiable liquid material (5) in a cavity (100), wherein the cavity (100) comprises a first surface portion (101), wherein the first surface portion (101) of the cavity (100) is formed by a first deformable membrane (2);

vi) adjusting a shape of the first deformable membrane (2), such that the shape of the first deformable membrane (2) corresponds to the shape determined from the customer data for the first surface (12-1) of the optical element (12);

vii) solidifying the liquid material (5) to obtain the optical element (12), wherein the first surface (12-1) of the optical element (12) conforms to the first deformable membrane (2), such that the optical element (12) comprises an optical property adjusted by the shape of the first surface (12-1), wherein the optical property of the optical element (12) that is adjusted by the shape of the first surface is selected from one or more of the group consisting of: an optical aberration, astigmatism, cylinder, prism, coma.

* * * * *